United States Patent
Drill

(10) Patent No.: US 9,803,740 B2
(45) Date of Patent: Oct. 31, 2017

(54) PUMP FOR A TORQUE TRANSFER MECHANISM

(71) Applicant: Magna Powertrain of America, Inc., Troy, MI (US)

(72) Inventor: Daniel Drill, Rochester, MI (US)

(73) Assignee: MAGNA POWERTRAIN OF AMERICA, INC., Troy, MI (US)

( * ) Notice: Subject to any disclaimer, the term of this patent is extended or adjusted under 35 U.S.C. 154(b) by 0 days.

(21) Appl. No.: 14/519,517

(22) Filed: Oct. 21, 2014

(65) Prior Publication Data

US 2015/0107405 A1 Apr. 23, 2015

Related U.S. Application Data

(60) Provisional application No. 61/893,596, filed on Oct. 21, 2013.

(51) Int. Cl.
F16H 57/028 (2012.01)
F16H 57/04 (2010.01)
B60K 17/344 (2006.01)

(52) U.S. Cl.
CPC ......... F16H 57/028 (2013.01); B60K 17/344 (2013.01); F16H 57/0441 (2013.01); *Y10T 74/2186* (2015.01)

(58) Field of Classification Search
CPC .. B60K 17/344; F16H 57/0441; F16H 57/028
See application file for complete search history.

(56) References Cited

U.S. PATENT DOCUMENTS

| | | | | |
|---|---|---|---|---|
| 6,017,202 A | * | 1/2000 | Durnack | F04C 14/04 418/166 |
| 7,410,349 B2 | * | 8/2008 | Ronk | F04C 2/102 418/135 |
| 7,445,438 B2 | | 11/2008 | Ronk et al. | |
| 7,624,853 B2 | | 12/2009 | Ekonen et al. | |
| 7,740,458 B2 | * | 6/2010 | Black | F04B 17/05 417/360 |
| 7,798,792 B2 | | 9/2010 | Ronk | |

(Continued)

FOREIGN PATENT DOCUMENTS

WO 9630227 A1 10/1996

OTHER PUBLICATIONS

International Search Report dated Feb. 4, 2015.
Written Opinion dated Feb. 4, 2015.

*Primary Examiner* — Vicky A Johnson
(74) *Attorney, Agent, or Firm* — Dickinson Wright PLLC

(57) ABSTRACT

A torque transfer mechanism for a vehicle, including a housing and a pump disposed therein. The housing includes an exterior surface, an interior surface, and an interior compartment. The interior surface of the housing includes at least one pocket formed therein with the at least one pocket having a plurality of pocket surfaces, which define an interior area. The pump includes a pump portion and a pump housing. The pump housing includes at least one projecting tab extending outwardly therefrom. The at least one projecting tab disposed within the at least one pocket to secure the pump within the transfer case housing. The at least one projecting tab has a pump crown disposed thereover, with the pump crown engaging each of the plurality of pocket surfaces and substantially filling out the interior area.

10 Claims, 3 Drawing Sheets

(56) References Cited

U.S. PATENT DOCUMENTS

| | | | |
|---|---|---|---|
| 8,024,859 B1* | 9/2011 | Stafford | F01C 21/007 184/11.3 |
| 2010/0059315 A1 | 3/2010 | Burns et al. | |
| 2012/0128521 A1 | 5/2012 | Schneider et al. | |

* cited by examiner

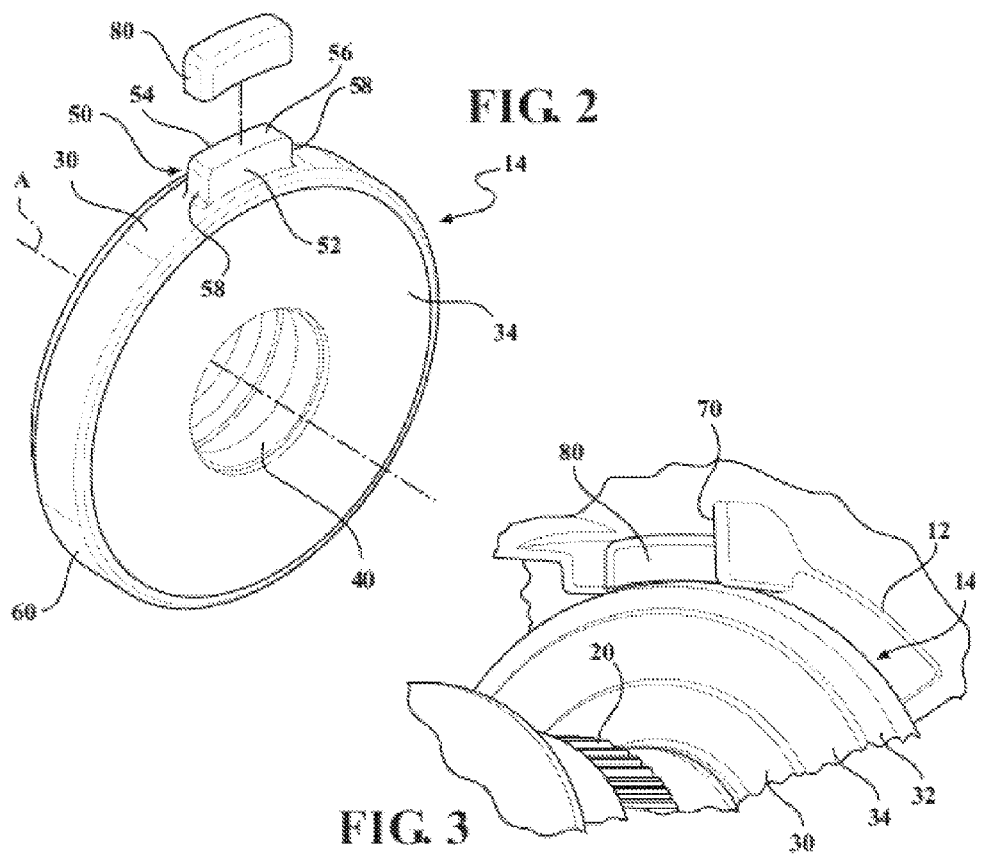
FIG. 2
FIG. 3
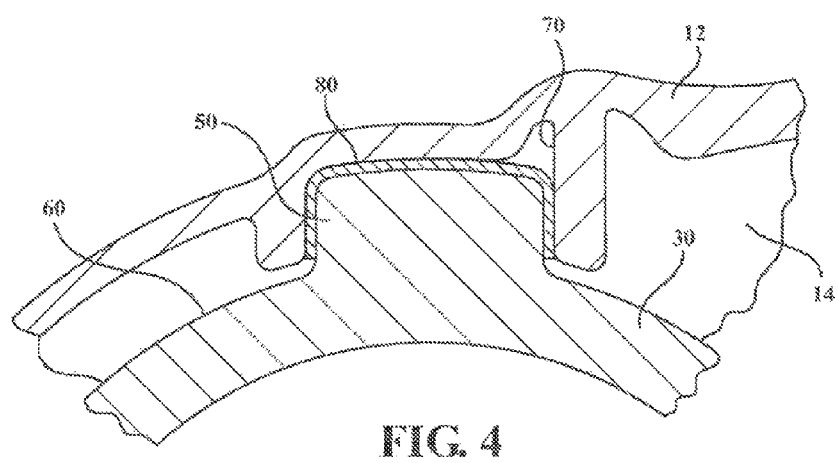
FIG. 4

US 9,803,740 B2

PUMP FOR A TORQUE TRANSFER MECHANISM

CROSS REFERENCE TO RELATED APPLICATION

The subject application claims priority to U.S. Provisional Patent Application Ser. No. 61/893,596 entitled "A Pump for a Rear Transfer Case Having a Pump Crown" and filed on Oct. 21, 2013, the disclosure of which is hereby incorporated by reference in its entirety.

TECHNICAL FIELD

The present disclosure relates generally to fluid pumps and, more particularly, to attachment of a fluid pump to a rear transfer case housing.

BACKGROUND OF THE INVENTION

This section provides background information related to the present disclosure which is not necessarily prior art.

As is conventional, fluid pumps, such as gerotor pumps are used in power transfer units of the type installed in motor vehicles for supplying lubrication to the rotary driven components. Such power transfer units include manual and automatic transmissions, transaxles, and four-wheel drive transfer cases. Typically, a gerotor pump has a stationary outer ring defining a pumping chamber and an inner ring positioned in the pumping chamber and which is fixed for rotation with a driven member (i.e., a shaft, etc.). The inner ring has external lobes which are meshed with and eccentrically offset from internal lobes formed on the outer ring. Since the number of internal lobes is greater than the number of external lobes, driven rotation of the inner ring results in a pumping action wherein a supply of hydraulic fluid is drawn from a sump in the power transfer unit into the suction side of the pumping chamber and is discharged from the pressure side of the pumping chamber at an increased pressure.

A drawback associated with conventional gerotor pumps is that the pumping action is only generated in response to rotation of the inner ring in one direction. As such, gerotor pumps are arranged in most power transfer units to generate the pumping action during rotation of the inner ring in a direction corresponding to forward driven operation of the motor vehicle. Since the gerotor pump does not generate a supply of hydraulic fluid when the inner ring is driven in the opposite direction, an undesirable condition may result wherein an inadequate supply of lubrication is delivered to the rotary components during extended periods of reverse operation. To alleviate this condition, some power transfer units are equipped with a first pump for lubricant supply in forward operation and a second pump for lubricant supply in reverse operation. As is obvious, the addition of a second pump adds both cost and weight to the power transfer unit. Thus, a continuing need exists to develop alternatives to conventional uni-directional gerotor pumps for use in power transfer cases.

To secure these gerotor pumps to the rear transfer case housing, the pump housing typically includes radial tabs formed around an outer periphery thereof, which are configured to engage pockets or keyways in the power transfer case housing to allow the pump to be firmly secured therein. These components are formed such that when the pump housing is installed in the rear transfer case housing, a nominal clearance exists between the radial tabs on the pump housing and the pockets formed in the transfer case housing. This clearance is intended to allow for blind installation of the rear housing over the pump. It is known that this nominal clearance can create undesirable noise issues in some vehicles, which results from the pump tab hitting the rear housing during vehicle operation. Eliminating this potential for noise would thus be highly desirable.

SUMMARY OF THE INVENTION

This section provides a general summary of the disclosure, and is not a comprehensive disclosure of its full scope or all of its features.

It is therefore an aspect of the present disclosure to provide a pump housing that is configured to attach to a rear transfer case housing such that any potential for undesirable noise issues is minimized.

It is another aspect of the present disclosure to provide an improved attachment of a pump housing to a rear transfer case housing such that any nominal clearance that may exist therebetween is taken into account and eliminated.

It is still another aspect of the present disclosure to provide a pump crown for attachment to a pump housing that minimizes the potential for noise issues after the pump housing is secured to an associated rear transfer case.

In accordance with the above and the other aspects of the present disclosure, a transfer case for a vehicle is provided. The transfer case includes a housing and a pump disposed in the housing. The transfer case housing includes an exterior surface, an interior surface, and an interior compartment. The interior surface of the housing includes at least one pocket formed therein with the at least one pocket having a plurality of pocket surfaces, which define an interior area. The pump includes a pump portion and a pump housing. The pump housing includes at least one projecting tab extending outwardly therefrom. The at least one projecting tab is configured to engage the at least one pocket to secure the pump within the transfer case housing. The at least one projecting tab has a pump crown disposed thereover with the pump crown being formed of a compressible material. The pump crown engages each of the plurality of pocket surfaces and substantially fills out the interior area.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure. Other advantages of the present disclosure will be readily appreciated, as the same becomes better understood by reference to the following detailed description when considered in connection with the accompanying drawings wherein:

FIG. 2 is a partially exploded view of a pump assembly in accordance with an aspect of the disclosure;

FIG. 3 is a schematic perspective view of a pump assembly mounted within a vehicle transfer case in accordance with an aspect of the disclosure;

FIG. 4 is a schematic end view of a pump assembly mounted within a vehicle transfer case in accordance with an aspect of the present disclosure;

DETAILED DESCRIPTION OF THE DISCLOSURE

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Figure 1:
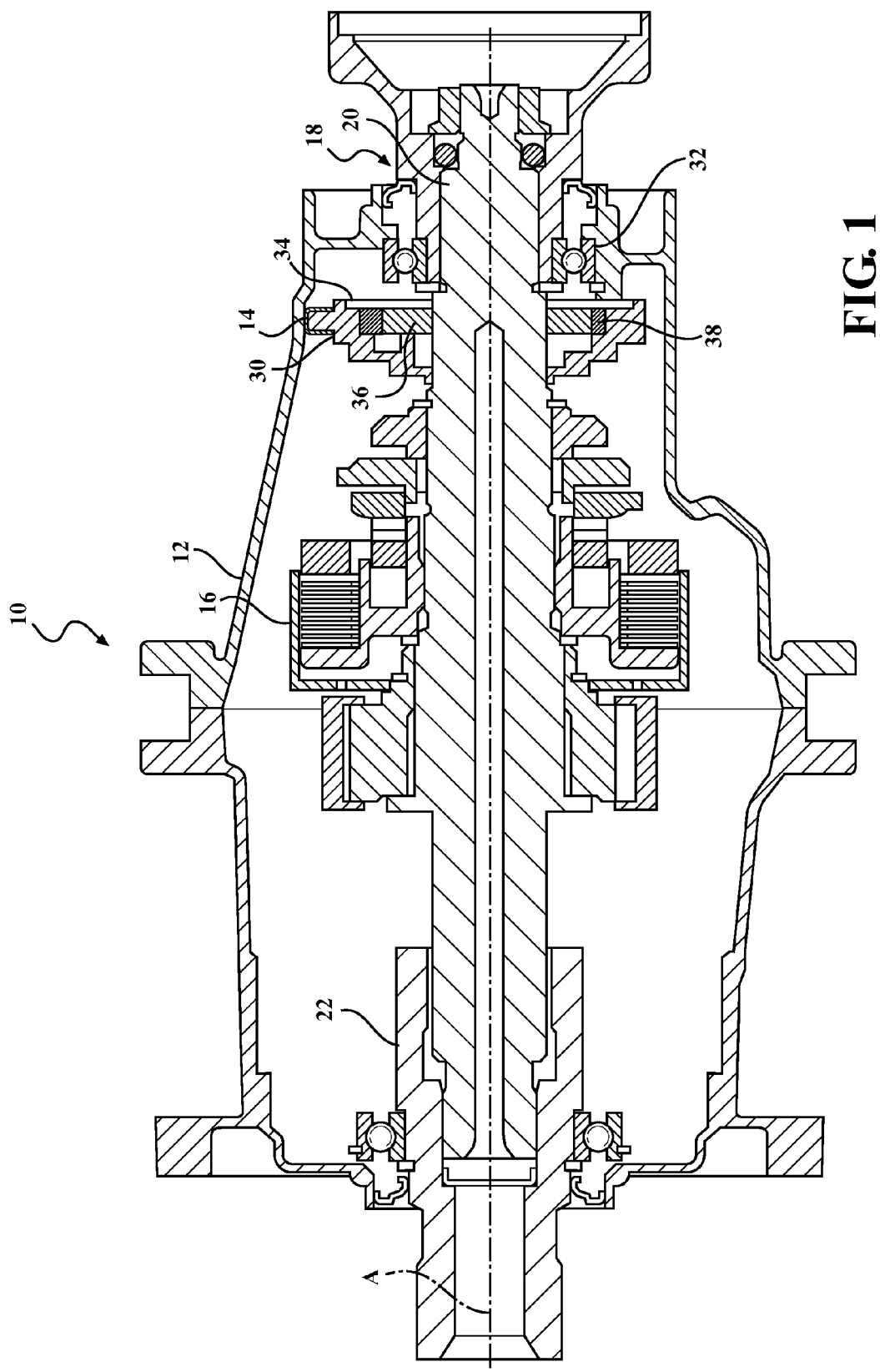
FIG. 1 is a schematic cross-sectional illustration of a vehicle transfer case in accordance with an aspect of the present disclosure.

With reference to FIG. 1, a cross-sectional illustration of an exemplary torque-transfer mechanism or transfer case 10 is illustrated. As shown, the torque transfer mechanism 10 includes a housing 12 that broadly encloses a pump 14, a transfer clutch 16, and a pump clutch 18. It will be appreciated that the configuration of the transfer clutch 16, the pump clutch 18 and the pump 14 may vary and take on any suitable known configuration. According to an aspect, the pump 14 may be a hydraulic pump. However, other suitable pump configurations may be employed.

In operation, an input shaft 20 that is at least partially disposed in the housing 12 is selectively coupled to a pinion shaft 22 via engagement of the transfer clutch 16. As is known, the transfer clutch 16 may be varied between a disengaged state and an engaged state to regulate torque transfer between the input shaft 20 and the pinion shaft 22. The hydraulic pump 14 is operable to provide pressurized fluid for cooling the pump clutch 18 based on relative rotation between the input shaft 20 and the pinion shaft 22. In addition, the pump clutch 18 may be operable to regulate the pumping action of the pump 14. More specifically, the pump clutch 18 may regulate operation of the pump 14 between a non-pumping state and a pumping state to vary the pressure of the fluid discharged therefrom. The torque transfer mechanism may be configured as described in Applicant's U.S. Pat. No. 7,624,853, which is hereby incorporated by reference as though set forth fully herein.

According to an aspect of the disclosure, FIGS. 1 and 2 illustrate a torque-limited mechanically-driven fluid pump 14 or gerotor pump. The pump 14 may be installed within the rear transfer case housing 12 transmission unit via a bearing assembly 32 for rotation about a first rotary axis "A". According to an exemplary aspect, the pump 14 may include a pump housing 30 and a cover plate 34, which together define a circular pump chamber within which a gerotor assembly is operably disposed. As will be appreciated, the origin of the circular pump chamber may be offset from the rotary axis of shaft. The pump housing 30 may include an inner rotor or pump ring 36 and an outer rotor or stator ring 38 that are rotatably disposed in the pump housing 30. According to an aspect, the inner rotor 36 may have a plurality of lobes disposed around its outer periphery that intermesh with a plurality of lobes formed on the inner periphery of the outer ring 38. As best shown in FIG. 2, the inner ring 38 may have a throughway 40 through which the input shaft 20 extends. It will be appreciated that the exact configuration of the pump may vary. For example, the pump 14 may be configured as and operate as described in Applicant's U.S. Pat. No. 7,445,438, which is hereby incorporated by reference as though set forth fully herein.

FIGS. 3 and 4 generally illustrate the engagement and attachment of the pump housing 30 to the housing 12 of the rear torque transfer mechanism or transfer case 10 according to an aspect of the disclosure. According to an aspect, the pump housing 30 may be fixed to the housing 12 by a plurality of bolts (not shown). As best shown in FIG. 2, the pump 14 preferably includes a plurality of tabs 50 disposed around an outer periphery 60 of the pump housing 30. The plurality of tabs 50 may be uniformly spaced about the outer periphery 60 and can extend generally outwardly. It will be appreciated that any number of tabs 50 may be employed. According to an aspect only a single tab 50 may be utilized. As shown, the tabs 50 may generally have a rectangular shape with a front face 52 and rear face 54, a top surface 56 and a pair of opposing side faces 58. The tabs 50 may have a variety of different shapes, sizes and configurations.

According to an aspect, the transfer case housing 12 may include a plurality of pockets 70 formed in an interior surface 72 thereof. The pockets 70 may be configured in a shape that is complimentary to shape of the tabs 50. As such, the pockets 70 may also have a generally rectangular shape. It will be appreciated that the number of pockets 70 is intended to equal the number of tabs 50 so that each tab 50 engages with a corresponding pocket 70. It will also be appreciated that the pocket 70 can take on a variety of different shapes. According to an aspect, the pocket 70 may have surfaces configured to match or engage the tab 50 to help retain it in position. As will be appreciated, each pocket 70 is configured to accept a tab 50 formed on the pump housing 30 to secure the pump 14 in place within the transfer case 10.

According to an aspect of the disclosure and with reference to FIGS. 2 through 4, the tabs 50 may each include a crown portion 80 disposed over an outer surface thereof. As can be seen, the crown portion 80 may be a separate structure that is configured to fit over and cover the entirety of the tab 50, namely each of the front face 52, rear face 54, top surface 56 and side faces 58. According to another aspect, the crown portion 80 may be formed of a coating that is disposed overtop of the tab 50, such as that is used as a conventional tool grip coating. According to a further aspect, the crown portion 80 may be formed of a stainless steel clip as is known to exist in connection with applications having magnesium housings. The crown portion 80 can be formed in a variety of different ways and may take on a variety of different configurations.

As shown in FIGS. 2 through 4, the crown portion 80 may be disposed over the tab 50 such that when the pump 14 is installed in the transfer case 10 and the tab 50 is received in a respective pocket 70, the crown portion 80 serves to take up any excess space or clearance that would normally exist between the tab 50 and the pocket 70 such as is known to exist to facilitate manufacture and assembly of these components. The amount of this clearance that exists with existing design components, and thus which is filled by the crown portion 80, could be anywhere between 0 and 5.2 mm.

According to an aspect and with reference to FIGS. 5 through 8, an exemplary crown portion 80 is disclosed. As shown, the crown portion 80 may be formed as a separate structure that is placed over the tab 50 and secured thereto. According to an aspect, the crown portion 80 may be formed of a compressible, durable material that can withstand the rigors and conditions of the environment that exists in the transfer case 10. The crown portion 80 may be constructed of a plastic material. However a variety of other suitable materials may be employed. An example of a suitable material is a thermoplastic polyester elastomer such as Hytrel® 7246.

Figure 5:
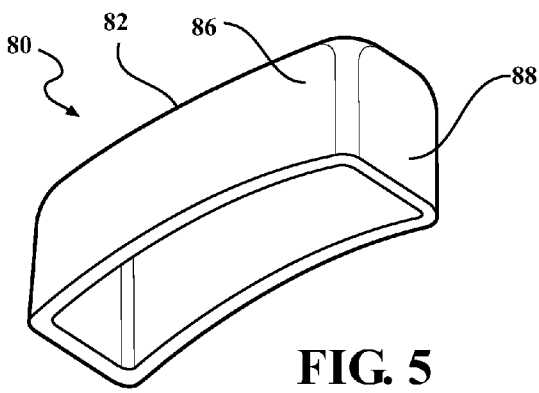
FIG. 5 is a perspective view of a pump crown for attachment to a pump assembly in accordance with an aspect of the present disclosure.
Figure 6:
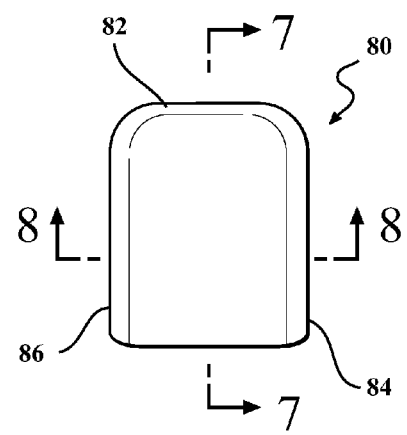
FIG. 6 is a side view of the pump crown of FIG. 5.
Figure 7:
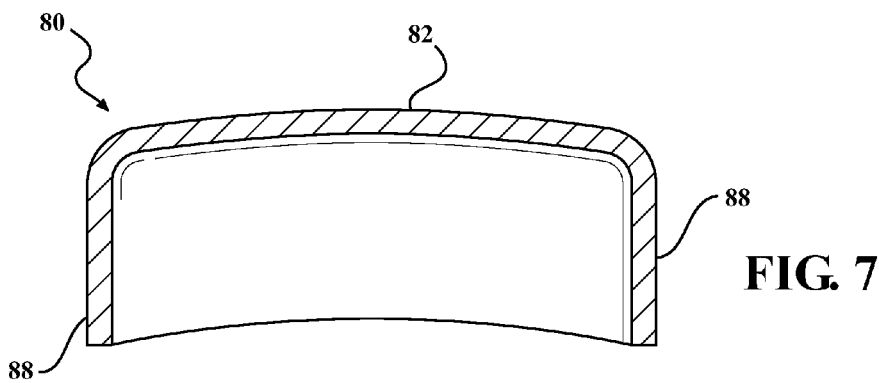
FIG. 7 is a cross-sectional view of the pump crown of FIG. 6 along the lines 7-7.
Figure 8:
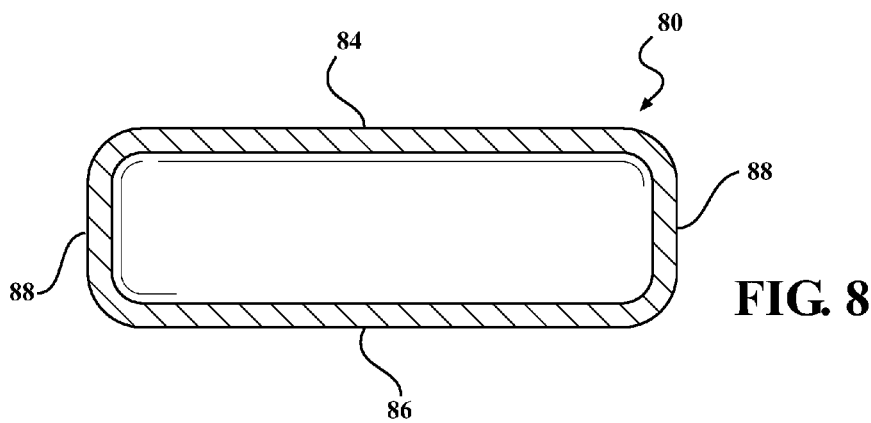
FIG. 8 is a bottom view of the pump crown of FIG. 5.

As shown, the crown portion 80 may be configured to match the shape of the tab 50. For example, the crown portion may have a top surface 82, a front surface 84, a back surface 86 and a pair of side surfaces 88. As shown in FIGS. 5 and 7, the crown portion 80 may have a generally arcuate shape when viewed from the side.

The utilization of a crown portion 80 disposed over the tab 50 and which can conform to the shape of the pocket 70 ensures that there is only minimal remaining space in the pocket 70. Put another way, any relative movement of the tab 50 within the pocket 70 may be minimized if not eliminated. This will serve to eliminate any undesirable noise. Additionally, utilizing a crown portion 80 over an existing tab 50 allows this to be accomplished without any modification to the transfer case housing 12 or the pump housing 30. This thus provides a cost efficient solution.

Note that not all of the activities described above in the general description or the examples are required, that a portion of a specific activity may not be required, and that one or more further activities may be performed in addition to those described. Still further, the orders in which activities are listed are not necessarily the order in which they are performed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A torque transfer mechanism comprising:
   a transfer case housing having an interior surface;
   at least one pocket formed in the interior surface of the transfer case housing, the at least one pocket having a plurality of surfaces which collectively define an interior area;
   a hydraulic pump disposed in the interior of the transfer case housing, the hydraulic pump having a pump portion and a pump housing;
   at least one tab extending outwardly from the pump housing and disposed within the at least one pocket to secure the pump within the transfer case housing;
   a crown having a crown front surface, a crown back surface, a crown top surface and a pair of crown side surfaces each disposed over the at least one tab;
   the crown in engaging relationship with each of the plurality of surfaces of the least one pocket to substantially fill out the interior area for minimizing movement of the at least one tab within the at least one pocket.

2. The torque transfer mechanism of claim 1, wherein the crown is comprised of a compressible material to allow the crown to conform to a shape of the interior area of the at least one pocket.

3. The torque transfer mechanism of claim 1, wherein the crown includes a coating disposed on the at least one tab.

4. The torque transfer mechanism of claim 1, wherein the crown is comprised of a stainless steel clip.

5. The torque transfer mechanism of claim 1, wherein the crown is comprised of a plastic material.

6. The torque transfer mechanism of claim 5, wherein the plastic material is a thermoplastic polyester elastomer.

7. The torque transfer mechanism of claim 1, wherein the at least one pocket is generally rectangular in shape and includes a front pocket surface, a rear pocket surface, a pair of side pocket surfaces, and a top pocket surface.

8. A rear transfer case for a vehicle comprising:
   a transfer case housing having an interior surface;
   at least one pocket formed in the interior surface of the transfer case housing, the at least one pocket having a plurality of surfaces which collectively define an interior area;
   a hydraulic pump disposed in the interior of the transfer case housing, the hydraulic pump having a pump portion and a pump housing;
   at least one tab extending outwardly from the pump housing and disposed within the at least one pocket to secure the pump within the transfer case housing;
   a crown having a crown front surface, a crown back surface, a crown top surface and a pair of crown side surfaces each disposed over the at least one tab;
   the crown in engaging relationship with each of the plurality of surfaces of the least one pocket to substantially fill out the interior area for minimizing movement of the at least one tab within the at least one pocket.

9. The transfer case of claim 8, wherein the crown is comprised of a compressible material to allow the crown to conform to a shape of the interior area of the at least one pocket.

10. The transfer case of claim 9, wherein the at least one pocket is rectangular in shape and includes a front pocket surface, a rear pocket surface, a pair of side pocket surfaces and a top pocket surface.

* * * * *